United States Patent
Rivero et al.

(10) Patent No.: US 9,243,729 B2
(45) Date of Patent: Jan. 26, 2016

(54) POSITION MAKE-UP INDICATOR SYSTEM

(75) Inventors: German Jose Rivero, Cypress, TX (US); Thomas E. Dunn, Jr., Magnolia, TX (US); Claudie Wayne Parker, Conroe, TX (US)

(73) Assignee: Hunting Energy Services, Inc., Houston, TX (US)

( * ) Notice: Subject to any disclaimer, the term of this patent is extended or adjusted under 35 U.S.C. 154(b) by 79 days.

(21) Appl. No.: 13/368,004

(22) Filed: Feb. 7, 2012

(65) Prior Publication Data

US 2012/0210552 A1  Aug. 23, 2012

Related U.S. Application Data

(60) Provisional application No. 61/444,912, filed on Feb. 21, 2011.

(51) Int. Cl.
| | |
|---|---|
| *B23Q 17/00* | (2006.01) |
| *B21D 39/00* | (2006.01) |
| *B23Q 15/00* | (2006.01) |
| *F16L 25/00* | (2006.01) |
| *B43L 7/00* | (2006.01) |
| *E21B 19/16* | (2006.01) |
| *F16L 15/08* | (2006.01) |

(52) U.S. Cl.
CPC ............. *F16L 15/08* (2013.01); *F16L 2201/10* (2013.01); *Y10T 29/49766* (2015.01)

(58) Field of Classification Search
CPC .................. F16L 15/08; F16L 2201/10; Y10T 29/49766; Y10T 29/49771; Y10T 29/49776; Y10T 29/49769; Y10T 29/49778; Y10T 29/4978

USPC ............... 29/407.01, 407.02, 407.03, 407.04, 29/407.05, 407.08, 407.1, 456, 705; 285/333, 334, 93; 33/412, 494, 501.45, 33/529, 679.1; 166/380, 77.51, 78.1, 85.1
See application file for complete search history.

(56) References Cited

U.S. PATENT DOCUMENTS

| | | | |
|---|---|---|---|
| 4,127,927 A |  | 12/1978 | Hauk et al. |
| 4,614,120 A | * | 9/1986 | Fradin et al. ..................... 73/761 |
| 4,835,873 A | * | 6/1989 | Weems ........................... 33/21.3 |

(Continued)

FOREIGN PATENT DOCUMENTS

| | | |
|---|---|---|
| EP | 0159242 A1 | 10/1985 |
| FR | 2636119 A1 | 3/1990 |

OTHER PUBLICATIONS

EP Application No. 12749018, European Search Report, dated Apr. 29, 2015, Munich Germany.

*Primary Examiner* — Essama Omgba
*Assistant Examiner* — Darrell C Ford
(74) *Attorney, Agent, or Firm* — Charles D. Gunter, Jr.

(57) ABSTRACT

A method is shown by which threaded pipe sections are connected to form a tubular joint having proper sealing positioning at proper make-up torque. A make-up stencil plate is manufactured for each specific size of pipe to be coupled at the specific taper and make-up loss of a given connection with very tight tolerance. The plate is placed on the pin pipe end of the connection. A dial indicator is placed on the outer surface of the pipe pin end with the indicator flush with the end of the stencil plate. Once the indicator is set to zero, the stencil plate is removed. Then a bucking unit or power tong is applied to the coupling. When the face of the coupling hits the tip of the indicator and the indicator is within the given tolerance, the operator stops the make-up process.

4 Claims, 4 Drawing Sheets

(56) References Cited

U.S. PATENT DOCUMENTS

| | | | |
|---|---|---|---|
| 4,919,455 A * | 4/1990 | Yoshiro | 285/23 |
| 4,962,579 A | 10/1990 | Moyer et al. | |
| 5,040,827 A * | 8/1991 | DeLange | 285/18 |
| 5,233,742 A * | 8/1993 | Gray et al. | 29/407.03 |
| 5,411,301 A * | 5/1995 | Moyer et al. | 285/333 |
| 5,661,888 A | 9/1997 | Hanslik | |
| 6,009,611 A * | 1/2000 | Adams et al. | 29/407.01 |
| 6,212,763 B1 * | 4/2001 | Newman | 29/702 |
| 6,279,242 B1 * | 8/2001 | Williams et al. | 33/501.45 |
| 6,363,598 B1 | 4/2002 | Staudt et al. | |
| 6,385,837 B1 * | 5/2002 | Murakami et al. | 29/407.02 |
| 6,942,254 B2 * | 9/2005 | Cartsensen | 285/123.1 |
| 7,987,924 B2 * | 8/2011 | Mitchell et al. | 175/27 |
| 2001/0000832 A1 * | 5/2001 | Newman | 29/714 |
| 2001/0015555 A1 * | 8/2001 | Mallis | 285/333 |
| 2002/0133960 A1 * | 9/2002 | Cross | 33/412 |
| 2003/0098585 A1 * | 5/2003 | Tsujimura | F16L 15/004 285/333 |
| 2003/0178847 A1 | 9/2003 | Galle, Jr. et al. | |
| 2004/0084901 A1 * | 5/2004 | Church | 285/333 |
| 2004/0231127 A1 * | 11/2004 | Cartsensen | 29/426.4 |
| 2006/0273586 A1 | 12/2006 | Reynolds, Jr. et al. | |
| 2010/0289256 A1 * | 11/2010 | Shumard | 285/18 |
| 2013/0277960 A1 * | 10/2013 | Neal et al. | 285/93 |
| 2013/0307260 A1 * | 11/2013 | Laakso et al. | 285/93 |
| 2014/0115907 A1 * | 5/2014 | Gamon | 33/286 |
| 2014/0125052 A1 * | 5/2014 | McAlister | 285/93 |
| 2015/0211309 A1 * | 7/2015 | Davis | E21B 41/00 166/380 |
| 2015/0308201 A1 * | 10/2015 | Breziat | E21B 19/165 29/407.01 |

* cited by examiner

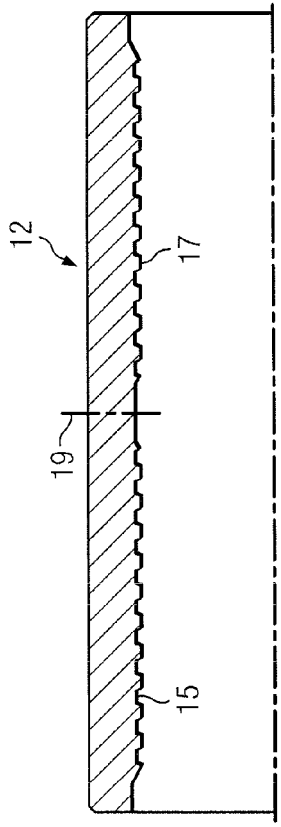
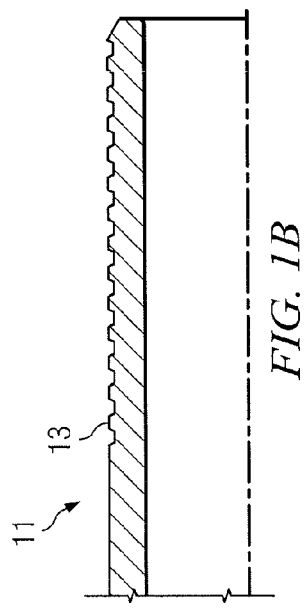
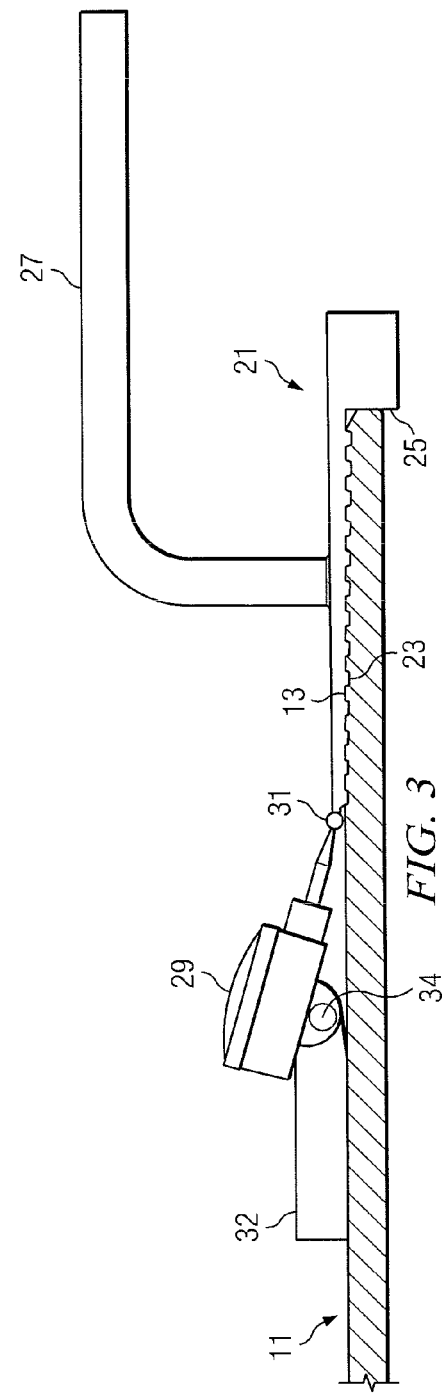

POSITION MAKE-UP INDICATOR SYSTEM

CROSS-REFERENCE TO RELATED APPLICATIONS

The present application claims priority from a U.S. provisional application Ser. No. 61/444,912, filed Feb. 21, 2011, entitled "Position Make-Up Indicator System", by the same inventors.

BACKGROUND OF THE INVENTION

1. Field of the Invention

The present invention relates generally to pipe joints in a pipe string and more specifically, to a plate-indicator position make-up method to accurately determine the position make-up of connections on pipe, such as the couplings used on oil field tubular goods.

2. Description of the Prior Art

A wide variety of drill pipe, tubing and casing (tubular goods) for oil and gas drilling, completion, production and stimulation activities are available at the present time. In the case of sections of such tubular goods used in the oil field (for example long sections of well casing or tubing), such sections of pipe usually have a tapered, exteriorly-threaded male end called a pin member. Such pin members are threaded into couplings, collars or integral female pipe sections, having threaded ends referred to as the box member. These box members have an interiorly-threaded tapered thread surfaces corresponding to their respective pin members for mating with the pin members to form threaded connections.

One type of connection for these joints is the American Petroleum Institute ("API") threaded and coupled connection that achieves its assembly without torque shoulders. These tapered connections provide increasing bearing stresses to provide the seal between the pin member and box member with increasing engagement produced by rotational torque. It is well known in the petroleum industry that the performance of an API connection is highly dependent on the make-up assembly (engagement) condition of the joint, and therefore it is important to determine if the joint is made-up properly. A number of factors can affect the integrity of the assembly process, including friction-related factors such as thread dope, plating type and thickness, surface finishes, eccentricity, ovality, impurities (dirt or rust) and external factors such as stab alignment and wind loading that occur at the well site.

A number of methods have been used in the prior art in order to monitor and control make-up of oilfield tubular connections. One type of method is the "torque-only" method based upon the read-out of a load cell attached to the joint or power make-up tongs and calibrated for torque. This method has limitations because it does not provide enough information to distinguish quality control problems such as out-of-tolerance threads, cross-threading, or galling in every situation.

A second method, "torque-turn", requires sophisticated electronics including a computer and sensors to monitor both the torque and turns which add to operational costs and delay the running time of the pipe sections. The "torque-turn" method is extremely sensitive to a reference torque which is a relatively low value, typically 10 percent of the minimum torque. This torque is sometimes determined by API torque recommendations. After this reference torque is reached, a predetermined number of turns are counted in the make-up of the tubular connection. If a false reference torque occurs to activate the turn counter because of one of the above described quality control problems or assembly conditions, an improper Joint make-up will result.

A third method is where the torque imposed on premium thread connections between tubular joints is monitored and plotted as a function of time rather than the number of turns. In this manner, the torque can be detected at the time metal-to-metal sealing contact is achieved during make-up of the connection. Further, torque response of the connection may be monitored after shouldering occurs.

Despite the above advances, there has been a long-felt need in the oil and gas industry for a simplified method of determining in the field the integrity of such joint make-up visually, thereby avoiding the need for complex instrumentation such as used in the "torque-turn" or "torque-time" methods or the need for elaborate calibration methods for the instrumentation involved. Proposed methods have included the use of barrettes, measuring from the open end of the pipe and the use of a permanent mark on the outer diameter of the pipe. Each of these techniques has some disadvantage. The barrette method is highly accurate but only works on hooked threads. Measuring from the open end may not be possible with some bucking units and is troublesome and may easily result in mistakes. The use of permanent mark on the OD can delay production in applying the mark and location control may not be very accurate.

As a result, even while using these above methods for making up joints, problems still continue to arise and the industry still suffers problems when forming such joints. These problems include influent and effluent pipe leakage because of lack of good sealing in improperly made-up joints. The following references are typical of other attempts in the prior art to solve the above described problems, but should be understood as being only representative of the prior art in the field. Each of these references primarily deals with a method for properly torqueing a threaded pipe connection.

U.S. Pat. No. 4,962,579 teaches a method for visually determining on the rig floor if a joint is properly made up with the right amount of torque. A registry mark is placed on the exterior of the first pipe section for proper axial engagement of the pin member with the coupling or box member. The position is determined by finite element analysis.

U.S. Pat. No. 5,212,885 shows a method for achieving proper sealing positioning and proper make up torque of threaded pipe sections. If the face of the box member is properly positioned relative to a triangle mark on the pipe section, make up is terminated. If the face has not reached edge of the triangle mark, torque is increased until either the face progresses into the body of the triangle mark or until maximum torque occurs.

U.S. Pat. No. 4,614,120 shows a method for determining proper make-up torque for pipe joints. A reference mark is set on the male element and on the female element. A grease is applied to the joint and the joint is made up using sufficient torque to cause one element to rotate with the respect to the other element. The joint is torqued until one element reaches a predetermined angle beyond the point where the reference marks are facing each other. This operation is repeated with a determination being made of the range of torques to be applied to the joint with a particular grease being utilized.

U.S. Pat. No. 5,661,888 shows an apparatus for positing two threaded pipes within a target range of relative axial positions. The device supposedly offers advantages over using visual "bench marks" placed on the pin and box members. The device includes a sensor and calibrating device for positioning the sensor a calibrated distance from the end of one of the pipes. A signal generator generates a signal once the sensor head indicates that the relative axial position of the pipes are within the target range desired.

A need continues to exist, therefore, for an improved method for determining the position make-up of connections on pipe, such as couplings used on oil field tubular goods and similar connections.

SUMMARY OF THE INVENTION

The method of the invention is used for connecting threaded pipe sections to form a made-up tubular connection having proper sealing positioning at proper make-up torque. The method includes a series of steps beginning with a first pipe section including an externally threaded pipe pin end and a second pipe section including an internally threaded box end. A tubular make-up stencil plate is provided which is manufactured at a specific taper and make-up loss for each of a series of desired size pipe connections. The stencil plate is designed to be received on the pipe pin end in mating threaded fashion. A conventional dial indicator with an indicator tip and also having a magnetic base is placed on the first pipe section with the indicator tip being flush against an outer extent of the make-up stencil plate, the dial indicator being held in place by the magnetic base. The dial indicator is set to a zero position. The make-up stencil plate is then removed and the second pipe section is screwed onto the pin end of the first pipe section hand tight. Thereafter, a power torque device to is used toque the second pipe section onto the first pipe section. The power torque device can be, for example, either a bucking unit or power tong. The make-up operation using the power torque device is done at low revolution or low gear in order to control the displacement easily. The torqueing operation is stopped once the outer extent of the second pipe section hits the tip of the dial indicator and the indicator shows a given predetermined tolerance.

The make-up stencil plate is a tubular member having an internally threaded surface which mates with the externally threaded face of the pipe pin member. The make-up stencil plate also has an internal shoulder stop which guarantees a proper zero point of the make-up plate on the mating pin member.

Preferably, the second pipe section is a pipe coupling having opposing internally threaded surfaces which form a pair of oppositely arranged box ends for the coupling. The coupling internally threaded surfaces are preferably shoulderless. The preferred pipe sections are part of a pipe string of non-upset threaded and coupled connections with mating pin ends which contact pin nose-to-nose to create a positive torque stop. The preferred pipe string can be a section of oilfield casing or tubing. The use of the position make-up plate, as described, can be used to control the position make-up within a range of thousandths of an inch.

While inexpensive, this improvement provides a simple method to visually determine on the rig floor or at the pipe rack whether the joint is properly made up to thereby provide effective sealing of API tapered threaded joints or connections.

Additional objects, features and advantages will be apparent in the written description which follows.

BRIEF DESCRIPTION OF THE DRAWINGS

FIGS. 1A and 1B are quarter sectional views of one pipe pin end and mating coupling with the pin and coupling being shown spaced apart in order to illustrate the respective threaded surfaces and the relative make-up depth of the pin end within one box end of the coupling.

FIG. 3 is a quarter sectional view of the pin end of the pipe showing the positioning of a make-up stencil plate and dial indicator device used in the make-up method of the invention.

DETAILED DESCRIPTION OF THE INVENTION

Figure 2:
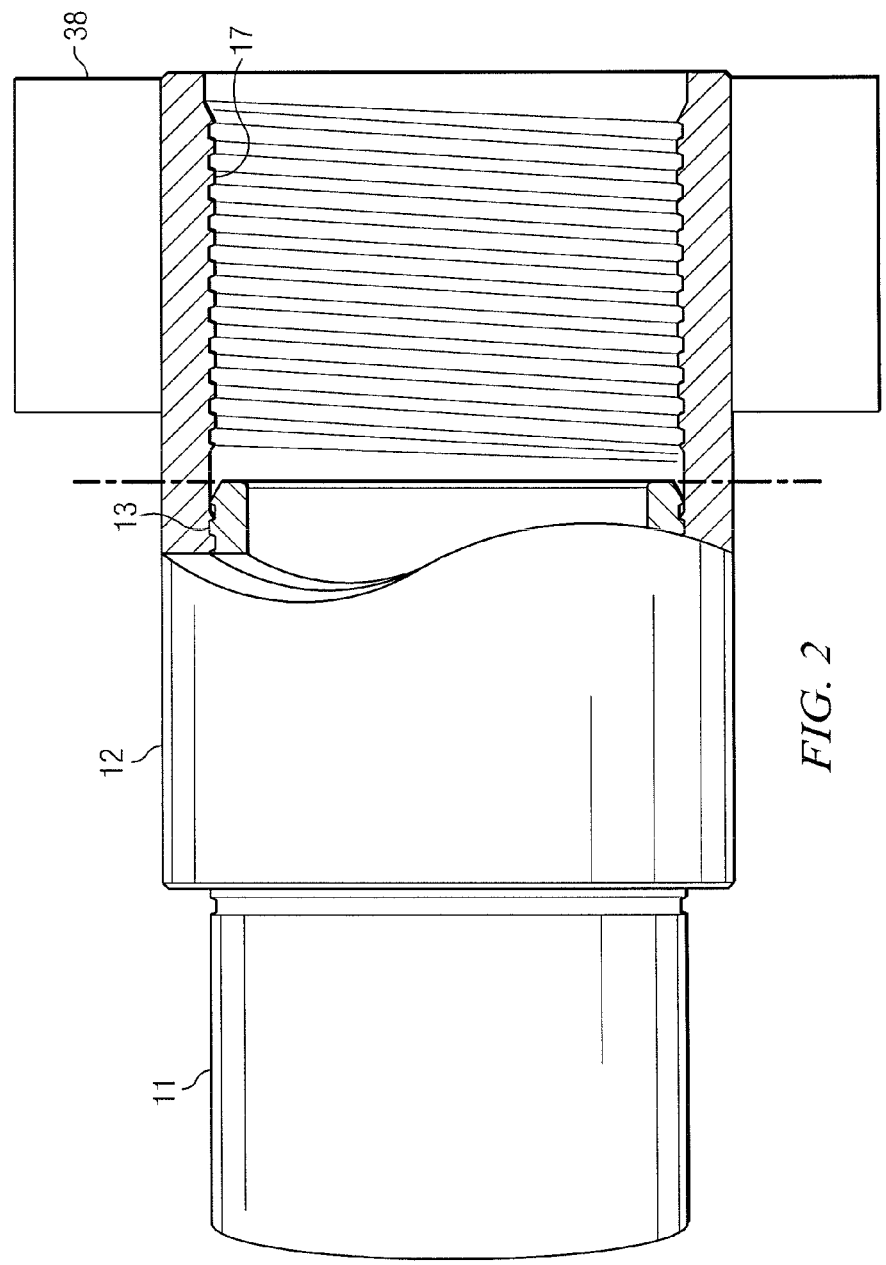
FIG. 2 is a perspective view, partly cut away, showing the pin end received within the mating pipe coupling and showing the coupling centerline.

The preferred version of the invention presented in the following written description and the various features and advantageous details thereof are explained more fully with reference to the non-limiting examples included in the accompanying drawings and as detailed in the description which follows. Descriptions of well-known components and processes and manufacturing techniques are omitted so as to not unnecessarily obscure the principle features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

The components of a tubular connection made up using the method of the present invention are shown in FIGS. 1A and 1B of the drawings and will be discussed in detail below. The term "make-up" will be taken to mean the power tight application of a coupling or box connector to a pin connector. The present invention can be used with, for example, oil field tubing or casing. The connection of the invention is especially useful for tubular couplings or collars, and particularly with shoulderless designs which have no internal shoulder stop. One exemplary connection which is sold commercially and which can be made-up according to the principles of the invention is the TKC 4040 RTC™ connection sold by Hunting Energy Services of Houston, Tex. This particular connection is a non-upset threaded and coupled connection with mating pin ends which create a positive torque stop as a result of the shouldering pin noses upon make-up. The present invention is thus advantageously used with a tapered threaded and coupled connection that achieves its connection without internal, external or mid-section torque shoulders or without special threading such as the wedge thread or the like. This tapered connection achieves its desired sealing at proper axial positioning at proper make-up torque as will be explained in greater detail.

A first male pipe section 11 having an externally threaded pipe pin end 13 is shown in FIG. 1B. The pin end 13 will be threadedly engaged within one of the internally threaded surfaces 15, 17 of a second female pipe section 12 shown in FIG. 1A. As will be appreciated from FIG. 1A, the second, female pipe section, or coupling 12, has opposing box end openings. The second, female pipe section is internally tapered, but has no internal shoulder stop. The centerline of the female coupling is indicated by the vertical line 19. This is the approximate point at which the pin noses of the respective male pipe sections will make contact upon make-up creating the positive torque stop.

The method of the invention can be used for connecting threaded pipe sections of the above described type to form a made-up tubular connection having proper sealing positioning at proper make-up torque. The method will now be described with reference primarily to FIGS. 2-6 of the drawings. The method of the invention uses a specially manufactured "tubular make-up stencil plate", shown as 21 in FIG. 3. The make-up stencil plate is itself a tubular member having an internally threaded surface 23 which mates with the externally threaded surface 13 of the pipe pin member 11 whereby the stencil plate is received on the pipe pin end in mating threaded fashion. The make-up stencil plate is manufactured at a specific taper and make-up loss for each of a series of desired pipe connection sizes. The make-up loss is the amount of overlap of the female box end over the male pin end, indicated generally at "$l_1$," in FIG. 5. The make-up stencil plate also has an internal shoulder stop 25 which guarantees a proper zero point of the make-up plate on the mating pin member 11. The stencil plate 21 can also be provided with a handle 27 to assist a user in engaging the stencil plate on the pipe pin end.

In the next step in the method of the invention, a position locator, such as a dial indicator (29 in FIG. 3) is placed on the exterior of the first pipe section 11 with the tip 31 of the indicator being flush against an outer extent of the make-up stencil plate 21 with the dial indicator set to a zero position. Dial indicators, also known as dial gauges and probe indicators, are commercially available instruments used to accurately measure small linear distances. They are frequently used in industrial and mechanical settings, such as in lathe work and machining in general. They are named because the measurement results are typically displayed in a magnified way by means of a dial. Dial indicators typically measure ranges from 0.015 to 12.0 inches with graduations of 0.00005 to 0.001. The dial indicator 29 illustrated in the drawings has been modified by adding a permanent magnet 32. The indicator is joined to the magnet at a pivot point or hinge 34.

Figure 6:
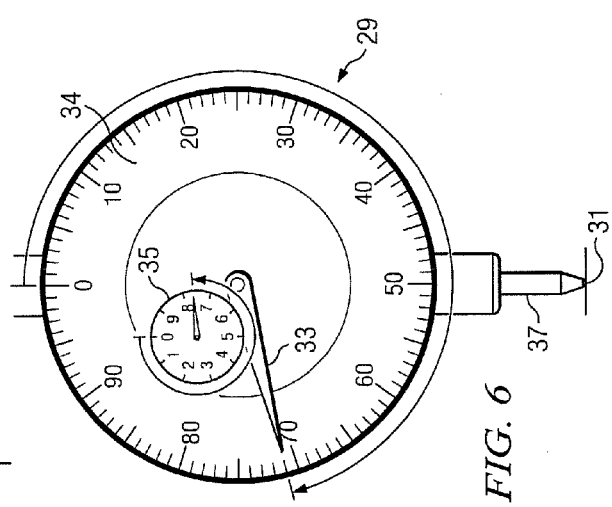
FIG. 6 is a simplified representation of a dial indicator measuring device of the type used in the method of the invention.

FIG. 6 shows the face of the dial indicator 29 in greater detail. The indicator 29 consists of a graduated dial 34 and needle 33 to record minor increments, with a smaller embedded clock face and needle 35 to record the number of needle rotations on the main dial. The dial has fine graduations for precise measurement. The spring-loaded plunger 37 moves perpendicular to the object being measured by either retracting or extending from the indicator's body. As an example reading, with the small hand between 3 and 4, this means that the reading is between 0.300 and 0.400 inch. The large hand at 52 means 52 thousandths from the last whole number (0.3 inch), so that the reading is 0.352 inches.

Figure 4:
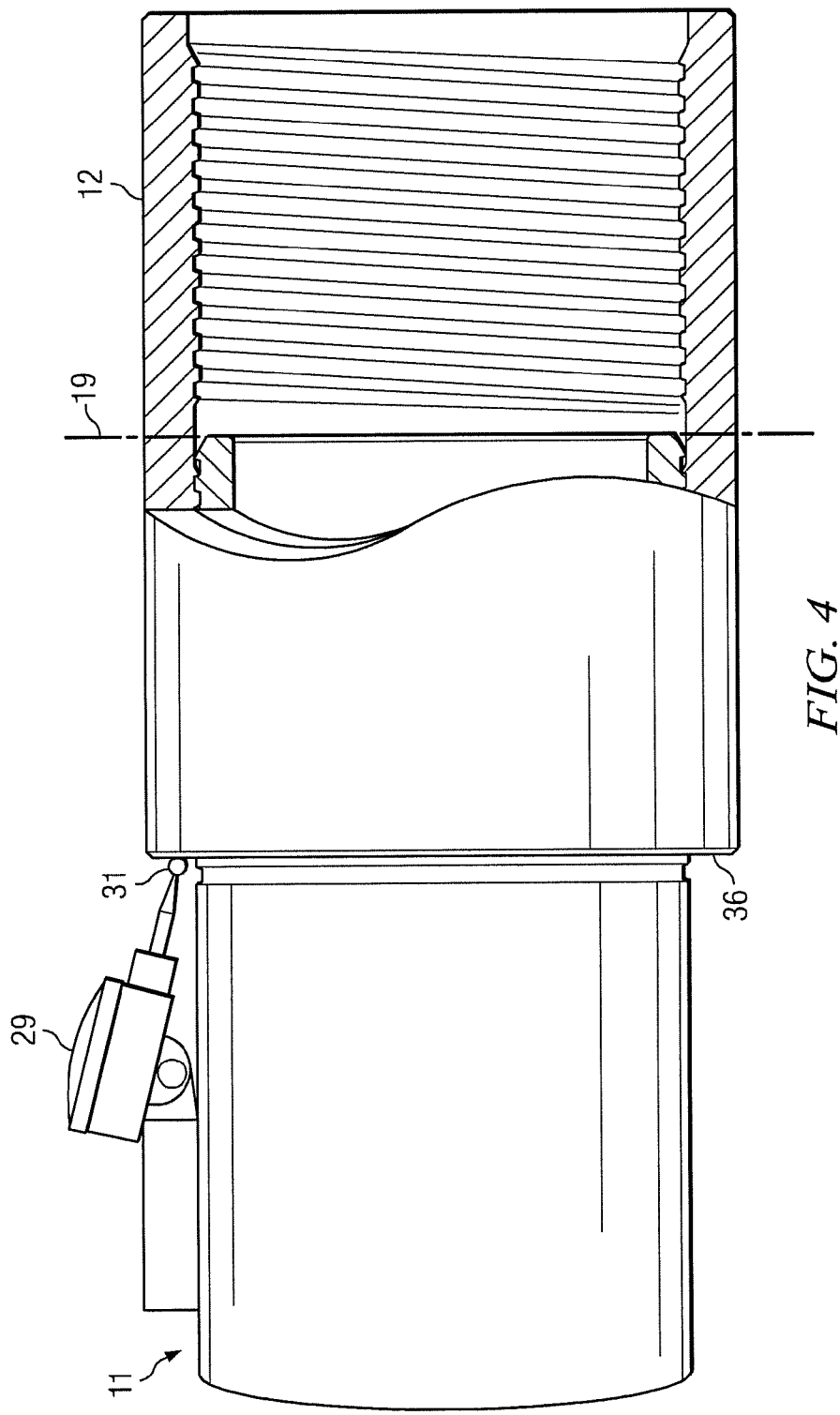
FIG. 4 is a view similar to FIG. 3, but showing a subsequent step in the method of the invention in which the pin pipe end is inserted within one box end of the coupling with the coupling being made-up to the power tight position.

In the next step in the method, illustrated in FIG. 4, the make-up stencil plate is removed and the second pipe section 12 is installed onto the pin pipe end of the first pipe section 11 hand tight. Thereafter, a power torque device is used to torque the second pipe section onto the first pipe section at a recommended RPM. The power torque device may be, for example, a power tong on a rig floor, or a power bucking unit. One difference in the two types of machines is that the "bucking" machine grips both the pipe sections outside surfaces whereas the power tong used on the rig floor (often referred to as floating or free make-up) typically grips only the pin member pipe sections. The position of one of the bucking unit dies is shown in simplified fashion by the block 38 in FIG. 2. The torque device is stopped when the indicator dial is at the desired location, for example, "zero" to plus 0.030 inches.

FIG. 4 shows the coupling 12 made up to the power tight position on the pin member 13 with the coupling outer extent 36 contacting the tip 31 of the dial indicator 29.

For typical pipe sizes, torque is typically applied to the connection at about 5-14 RPM. The make-up speed should typically not exceed about 14 RPM. The make-up speed should not vary excessively during make-up and should not be continuous with no gear changing. The following are typical target RPM's:

| Connection | Target RPM |
| --- | --- |
| 2⅜" | 14 |
| 2⅞" | 12 |
| 3½" | 10 |
| 4" | 8 |
| 4½" | 8 |
| 5" | 8 |
| 5½" | 8 |
| 7" | 8 |

Figure 5:
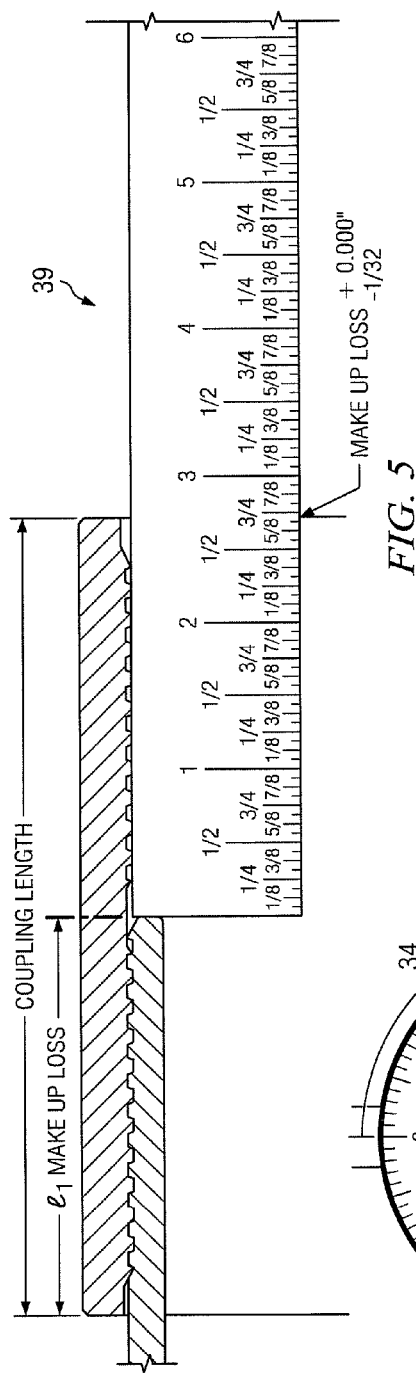
FIG. 5 is a quarter sectional view of the pin pipe end installed within the mating coupling illustrating the measurement of the make-up loss of the connection.

The integrity of the connection will then typically be verified through the open end using a scale, such as the scale 39 illustrated in FIG. 5. As previously mentioned, the make up loss "$l_i$" is measured as indicated in FIG. 5. Since the present method uses a position make-up connection, the pin nose should be located approximately in the middle of the coupling. In the example shown in FIG. 5, the make up position measured from the open end of the coupling should be about: 2.750"+0.000"/−1/32" (2.719° to 2.750" or 2²³⁄₃₂" to 2¾" scale reading). The table which follows gives some typical make-up losses for various size pipe:

| Size | Make-up Loss |
| --- | --- |
| 2⅜" | 2.750 |
| 5" | 3.250 |
| 5½" | 3.750 |
| 7" | 4.125 |

An invention has been provided with several advantages. The instant method makes it possible to control the make-up position of oil field tubular connections within thousandths of an inch (0.001") in a fast and productive way. It is very helpful whenever it is necessary to control the make-up position in a very accurate manner. As can be seen by the above description, this is a very simple and low cost method of ensuring proper make-up of connections while eliminating many of the problems of the past. An operator can use the dial indicator to visually determine the amount of pin member engagement into the coupling or box member. Furthermore, there is no dependence on relatively low and highly variable reference torque values. The method does not employ complicated instrumentation or require complicated set up or mathematical calibration.

While the invention has been shown in one of its forms, it is not thus limited and is susceptible to various changes and modifications without departing from the spirit thereof.

We claim:

1. A method of connecting threaded pipe sections to form a made-up tubular connection having proper sealing positioning at proper make-up torque where the connection is a position make-up connection, the method consisting of:

providing a first pipe section in the form of a pipe pin member including an externally threaded pipe pin end;

providing a second mating pipe section in the form of a coupling member including oppositely arranged internally threaded box ends;

wherein the pipe sections are part of a pipe string of non-upset threaded and coupled connections with mating pin ends which contact to create a positive torque stop;

wherein the coupling which is mated with the first pipe section has internally threaded surfaces which are shoulderless surfaces;

providing a tubular make-up stencil plate manufactured at a specific taper and make-up loss for each of a series of desired size pipe connections and screwing the stencil plate onto the pipe pin end in mating threaded fashion, wherein the make-up stencil plate is a tubular member having an internally threaded surface which mates with the externally threaded face of the pipe pin member, the make-up stencil plate also having an internal shoulder stop which guarantees a proper zero point of the make-up plate on the mating pin member;

placing a dial indicator with an indicator tip and a magnetic base on the first pipe section with the indicator tip being flush against an outer extent of the make-up stencil plate, the dial indicator being held in proper position on the first pipe section by the magnetic base;

setting the dial indicator to a zero position;

removing the make-up stencil plate and installing a selected box end of the pipe coupling onto the pin end of the first pipe section hand tight;

thereafter, using a power torque device to torque the pipe coupling onto the first pipe section to a final position;

stopping the torque once an outer extent of the pipe coupling hits the tip of the dial indicator and the indicator shows a given predetermined tolerance;

verifying the final position of the position make-up connection with a manual scale to ensure that the final position is within a specified tolerance; and thereafter installing a third pipe section with a pin end within an opposite end of the coupling.

2. The method of claim 1, wherein the pipe string is a section of oilfield casing or tubing.

3. The method of claim 1 wherein the power torque device is a device selected from among the group consisting of power tongs and power bucking units.

4. The method of claim 3, wherein the use of the position make-up plate can be used to control the position make-up within a range of thousandths of an inch.

* * * * *